(12) United States Patent
Wang

(10) Patent No.: US 11,994,233 B2
(45) Date of Patent: May 28, 2024

(54) EXTERNAL SHAFT CONNECTION ASSEMBLY FOR A VANE ACTUATOR

(71) Applicant: Easytork Automation Corporation, Maryland Heights, MO (US)

(72) Inventor: George Wang, Maryland Heights, MO (US)

(73) Assignee: Easytork Automation, Maryland Heights, MO (US)

( * ) Notice: Subject to any disclaimer, the term of this patent is extended or adjusted under 35 U.S.C. 154(b) by 776 days.

(21) Appl. No.: 17/110,160

(22) Filed: Dec. 2, 2020

(65) Prior Publication Data

US 2021/0164522 A1 Jun. 3, 2021

Related U.S. Application Data

(60) Provisional application No. 62/942,449, filed on Dec. 2, 2019, provisional application No. 62/942,463, filed on Dec. 2, 2019.

(51) Int. Cl.
*F16K 31/12* (2006.01)
(52) U.S. Cl.
CPC .................................. *F16K 31/12* (2013.01)
(58) Field of Classification Search
CPC .... F16K 31/12; F16D 2001/102; F16D 1/108; F16D 1/06
See application file for complete search history.

(56) References Cited

U.S. PATENT DOCUMENTS

| | | | | |
|---|---|---|---|---|
| 872,888 A * | 12/1907 | Adams | ..................... | B63C 11/44 114/330 |
| 3,237,528 A * | 3/1966 | Rose | ........................ | F16K 31/12 92/13 |
| 4,006,993 A * | 2/1977 | Woerlee | ..................... | F16D 1/06 403/404 |
| 5,318,477 A * | 6/1994 | Laux | ........................ | F16K 31/04 464/37 |
| 5,335,692 A * | 8/1994 | Hobson | .................. | F16K 5/0421 137/614.17 |
| 2011/0216624 A1 * | 9/2011 | Kozlowski | .......... | B01F 27/1127 366/279 |
| 2016/0305484 A1 * | 10/2016 | Hesse | ........................ | F16D 1/10 |
| 2016/0306733 A1 * | 10/2016 | Bates | ........................ | G06F 8/70 |
| 2018/0223910 A1 * | 8/2018 | Aiba | ..................... | F16D 1/0858 |

* cited by examiner

*Primary Examiner* — Patrick C Williams
(74) *Attorney, Agent, or Firm* — Polsinelli PC

(57) ABSTRACT

The present disclosure generally relates to an external shaft connection assembly. In particular, an external shaft connection assembly for use with vane actuators is disclosed. In various aspects, the disclosed assembly includes an external shaft connector to connect a valve to the vane actuator, an upper shaft to connect a positioner the vain actuator and a compression ferrule to ensure a tight fit with the vane actuator in order to overcome mechanical slop and inefficiencies in motion transmission due to variances in manufacturing tolerances.

18 Claims, 7 Drawing Sheets

EXTERNAL SHAFT CONNECTION ASSEMBLY FOR A VANE ACTUATOR

CROSS REFERENCE TO RELATED APPLICATIONS

The present application claims priority to U.S. Provisional Patent Application No. 62/942,449, entitled "Vane Actuator Vane Shaft External Connection Construction (1)," filed on Dec. 2, 2019, and U.S. Provisional Patent Application No. 62/942,463, entitled "Vane Actuator Vane Shaft External Connection Construction (2)," filed on Dec. 2, 2019. The contents of the aforementioned applications are incorporated herein by reference in their entireties.

FIELD OF DISCLOSURE

This disclosure relates to an external shaft connection assembly for a vane actuator. In particular, the external shaft may operably engage the vane actuator to a valve.

BACKGROUND

Existing connectors for engaging a vane actuator to an external shaft are subject to tolerances issues during manufacturing. As a result, undesirable gaps between the vane and the valve shaft may cause motion transmission errors.

In other connectors, motion transmission errors may be addressed by introducing tertiary hardware exterior to the structural body of the actuator, or through structural adjustments made within the actuator. The former approach prevents a flush mounting between the actuator and the valve, thereby requiring additionally costly hardware, while the later approach requires the time consuming disassembly of the actuator. As such, it is desirable to provide a connection structure that minimizes mechanical slop without costly support structures.

BRIEF SUMMARY

According to one aspect, an external shaft connection assembly for a vane actuator includes an external shaft connector configured to engage the vane actuator and a valve stem. The external shaft connector further includes a first end defining a connector recess configured to receive the valve stem and a second end defining a connector post configured to be received within the vane actuator. The connector post defining a ferrule recess and a perimeter of the connector post having one or more expansion slots. The externals shaft connecter also includes a thru hole in communication with the connector recess and the ferrule recess.

In another aspect, the connector post forms a mated connection with the vane actuator. In one aspect, the first end further defines a set screw hole transverse to a longitudinal axis of the external shaft connector and the external shaft connector further comprises a set screw to be received through the set screw hole and configured to engage and compress the valve stem against the connector recess.

In yet another aspect, the vane actuator further includes a slot through an exterior housing of the vane actuator aligned with the set screw hole.

According other aspects, the external shaft connection assembly also includes an upper shaft engaged the vane actuator opposite the external shaft connector. The upper shaft may be integrated with the vane actuator. Alternatively, the upper shaft is distinct from the vane actuator and further includes a first upper shaft end configured to engage a positioner and a second upper shaft end having an upper shaft post. The upper shaft post is configured to be received within the vane actuator and the upper shaft post defines an upper shaft ferrule recess while an upper shaft perimeter includes one or more upper shaft expansion slots.

In one aspect, the upper shaft post forms a mated connection with the vane actuator. The upper shaft may also include a threaded opening to receive a threaded fastener.

According to various aspects, the external shaft connection assembly also includes a compression ferrule. The compression ferrule is configured to be received in the ferrule recess. In yet other aspects, the compression ferrule further includes a lower ferrule region that is tapered from a first diameter at a central portion of the compression ferrule to a second diameter at a lower distal end and a ferrule thru-hole extending through the compression ferrule from an upper distal end to the lower distal end. In various aspects, the second diameter is less than the first diameter.

According to various aspects, the external shaft connection assembly also includes a connecting fastener. The connecting fastener is configured to be received in a vane shaft of the vane actuator through the external shaft connector, the compression ferrule and received in an upper shaft. In one aspect, the connection fastener is threaded and configured to draw the external shaft connector towards the vane shaft.

In another aspect, an external shaft connection assembly for a vane actuator includes an external shaft connector configured to engage the vane actuator and a valve stem. The external shaft connector further including a first end defining a connector recess configured to receive the valve stem, a second end defining a connector post configured to be received within the vane actuator, while the connector post defines a ferrule recess and a perimeter of the connector post includes one or more expansion slots. The external shaft connector also has a thru hole in communication with the connector recess and the ferrule recess. The external shaft connection assembly also has an upper shaft engaged to the vane actuator opposite the external shaft and a compression ferrule configured to be received in the ferrule recess. The compression ferrule further includes a lower ferrule portion that is tapered from a first diameter at a central portion of the compression ferrule to a second diameter at a lower distal end and a ferrule thru-hole extending through the compression ferrule from an upper distal end to the lower distal end. The external shaft connection assembly also has a connecting fastener configured to be received in vane shaft through the external shaft connector, the compression ferrule and received in the vane actuator. The connection fastener is threaded and configured to compress the external shaft connector towards the compression ferrule and the vane actuator such that one or more expansion slots of the external shaft connector expand outward upon compression against the compression ferrule to engage the vane shaft.

In various aspects, the upper shaft is integrated with the vane actuator or the upper shaft is distinct from the vane actuator. When distinct from the vane actuator, the upper shaft further includes a first upper shaft end configured to engage a positioner and a second upper shaft end comprising an upper shaft post. The upper shaft post is configured to be received within the vane actuator. The upper shaft post also defining an upper shaft ferrule recess configured to engage the compression ferrule and an upper shaft perimeter having one or more upper shaft expansion slots. The upper shaft ferrule recess further defines a threaded opening. In one aspect, the connecting fastener is further configured to be received in the upper shaft and configured to compress the upper shaft towards the vane actuator while one or more upper shaft expansion slots are configured to expand outward upon compression against the compression ferrule to engage the vane shaft.

According to one aspect, an external shaft connection assembly for a vane actuator includes an external shaft connector configured to engage the vane actuator and a valve stem. The external shaft connector further includes a first end defining a connector recess configured to receive the valve stem, where the first end further defines a set screw hole transverse to a longitudinal axis of the external shaft connector. A second end of the external shaft connector defines a connector post configured to be received within the vane actuator. The external shaft connector also includes a set screw to be received through the set screw hole and configured to engage and compress the valve stem against the connector recess. The vane actuator may further be configured to include a slot through an exterior housing of the vane actuator aligned with the set screw hole.

DETAILED DESCRIPTION

Figure 1:
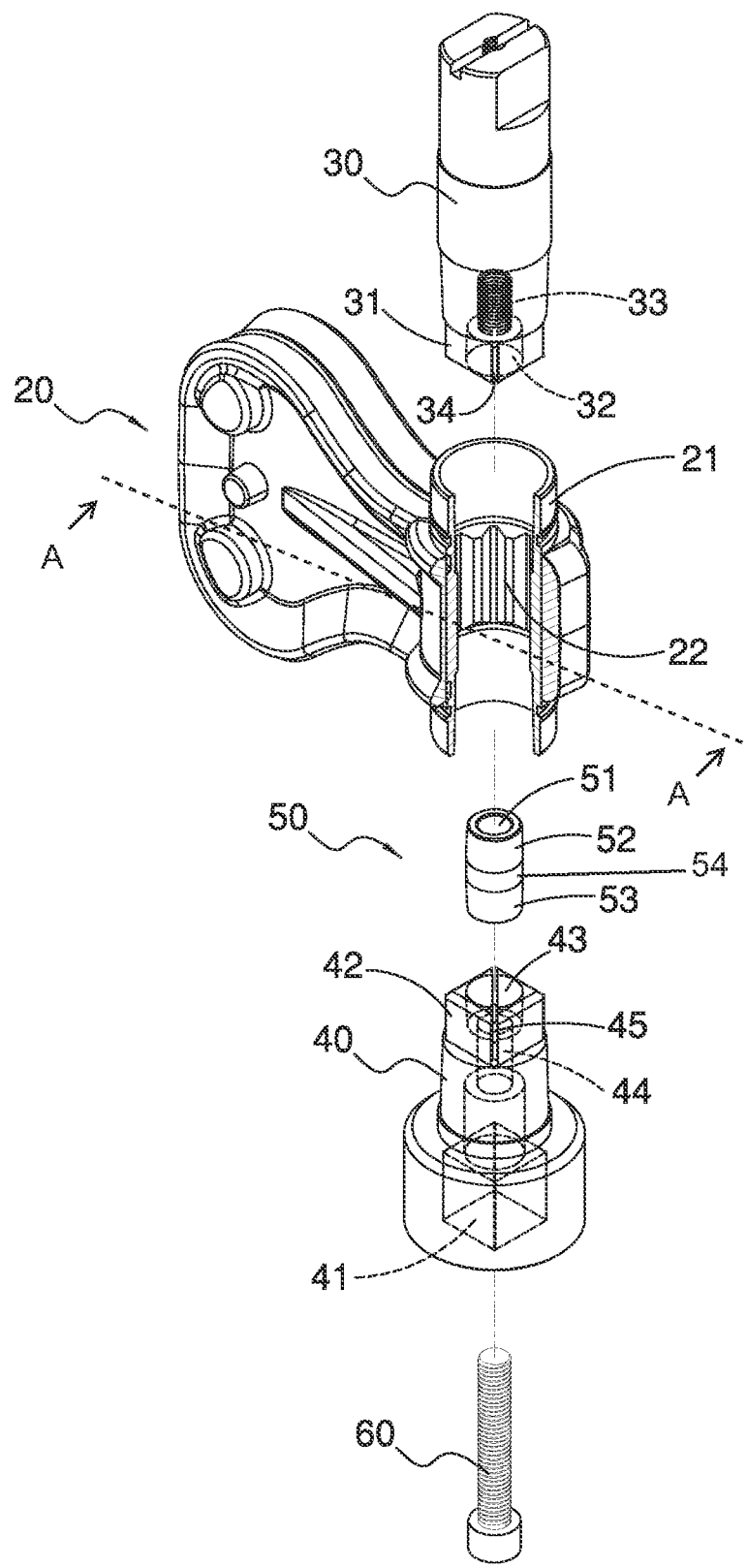
FIG. 1 is an exploded view of an external shaft connection assembly according to one aspect.
Figure 2:
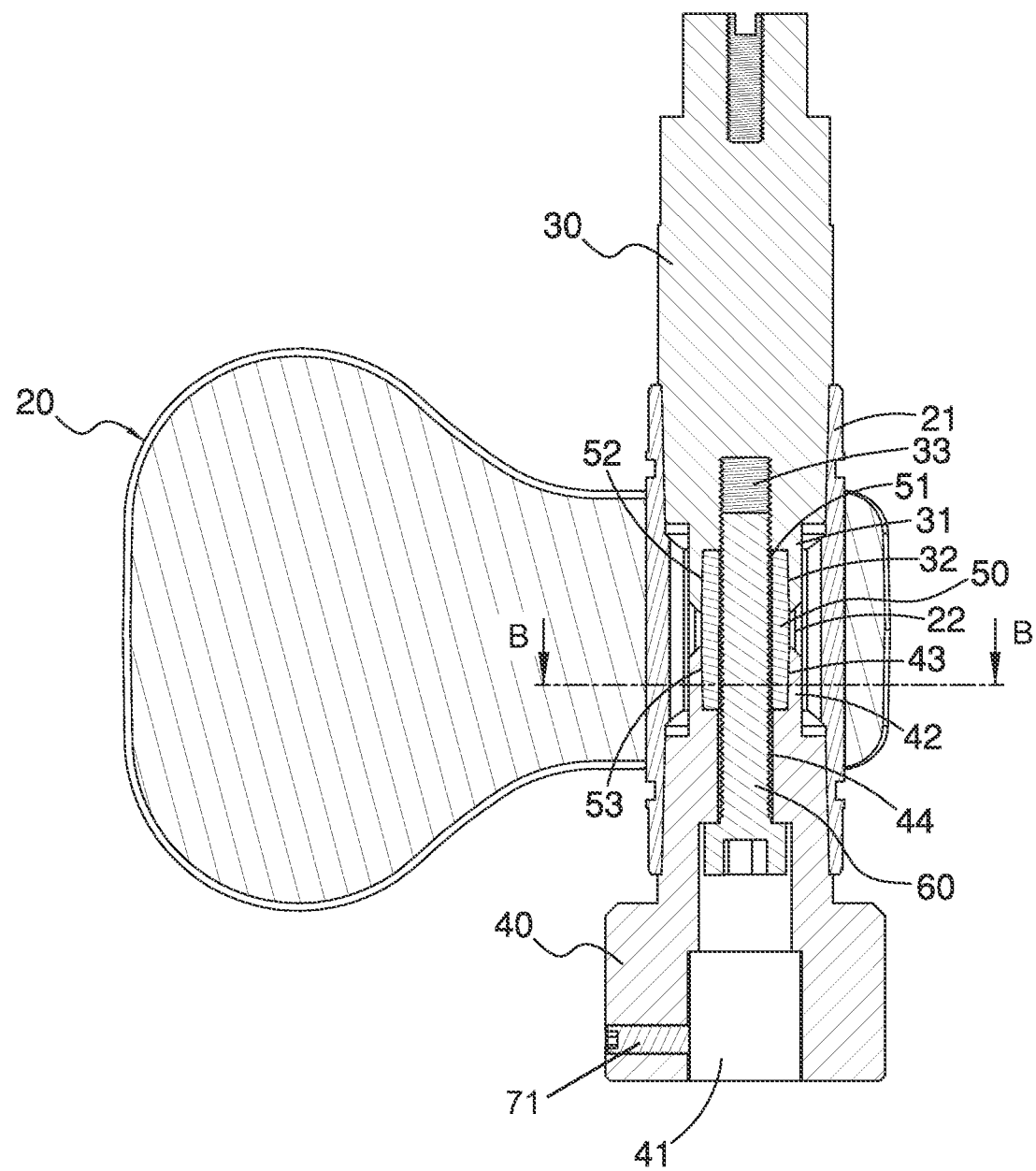
FIG. 2 is a cross section view of the assembled external shaft connection assembly of FIG. 1, as viewed along line A-A, according to one aspect.
Figure 3:
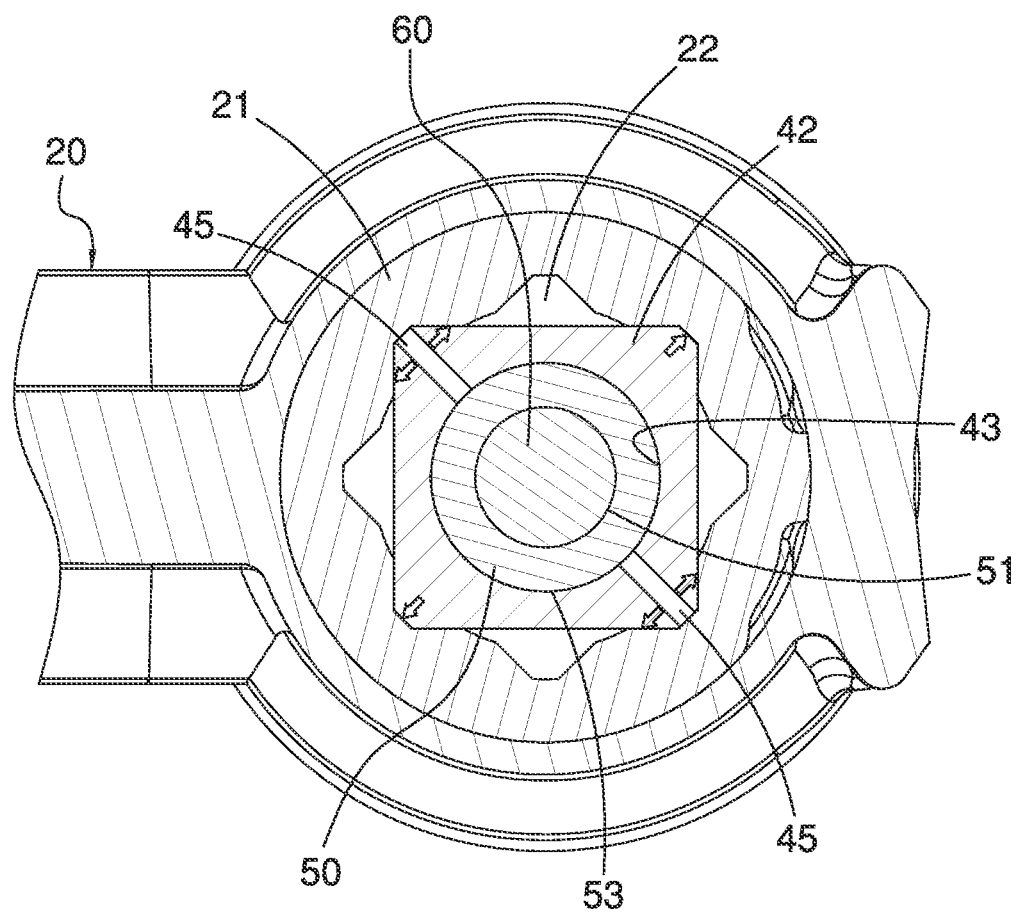
FIG. 3 is a cross section view of the assembled external shaft connection assembly of FIG. 2, as viewed along line B-B, according to one aspect.

In various aspects, the external shaft connection assembly is provided to eliminate or mitigate tolerance differences between a vane shaft of a vane actuator and to an external shaft connector. A tolerance difference creates a gap or undesired space that causes inefficiencies, inaccuracies, and deviations from the intended motion transmission from a vane actuator to a valve stem.

Referring now to FIGS. 1-7, the external shaft connection assembly includes an external shaft connector 40, according to one aspect. In various other aspects, the external shaft connection assembly further includes a vane assembly 20, an upper shaft 30, a compression ferrule 50, and a connecting bolt 60.

According to one aspect, one end of the external shaft connector 40 defines an external shaft connector recess 41 to receive and engage a valve stem 91 of a connected valve 90. The valve stem 91 may be rotated with the external shaft connector 40. Another end of the external shaft connector 40 includes an external shaft connector post 42 that is configured to be received within a vane shaft 21 of the vane assembly 20 and to engage one or more vane shaft connection slots 22, such that the external shaft connector is rotated by the vane shaft 21. The external shaft connector post 42 further defines an external shaft connector ferrule recess 43.

Within the external shaft connector ferrule recess 43 the external shaft connector 40 further includes a thru hole 44 that provides communication between the external shaft connector ferrule recess 43 and the external shaft connector recess 41. In various aspects, the outer perimeter of the external shaft connector post 42 includes at least one external shaft connector expansion slot 45 that extends through to the external shaft connector ferrule recess 43.

Figure 4:
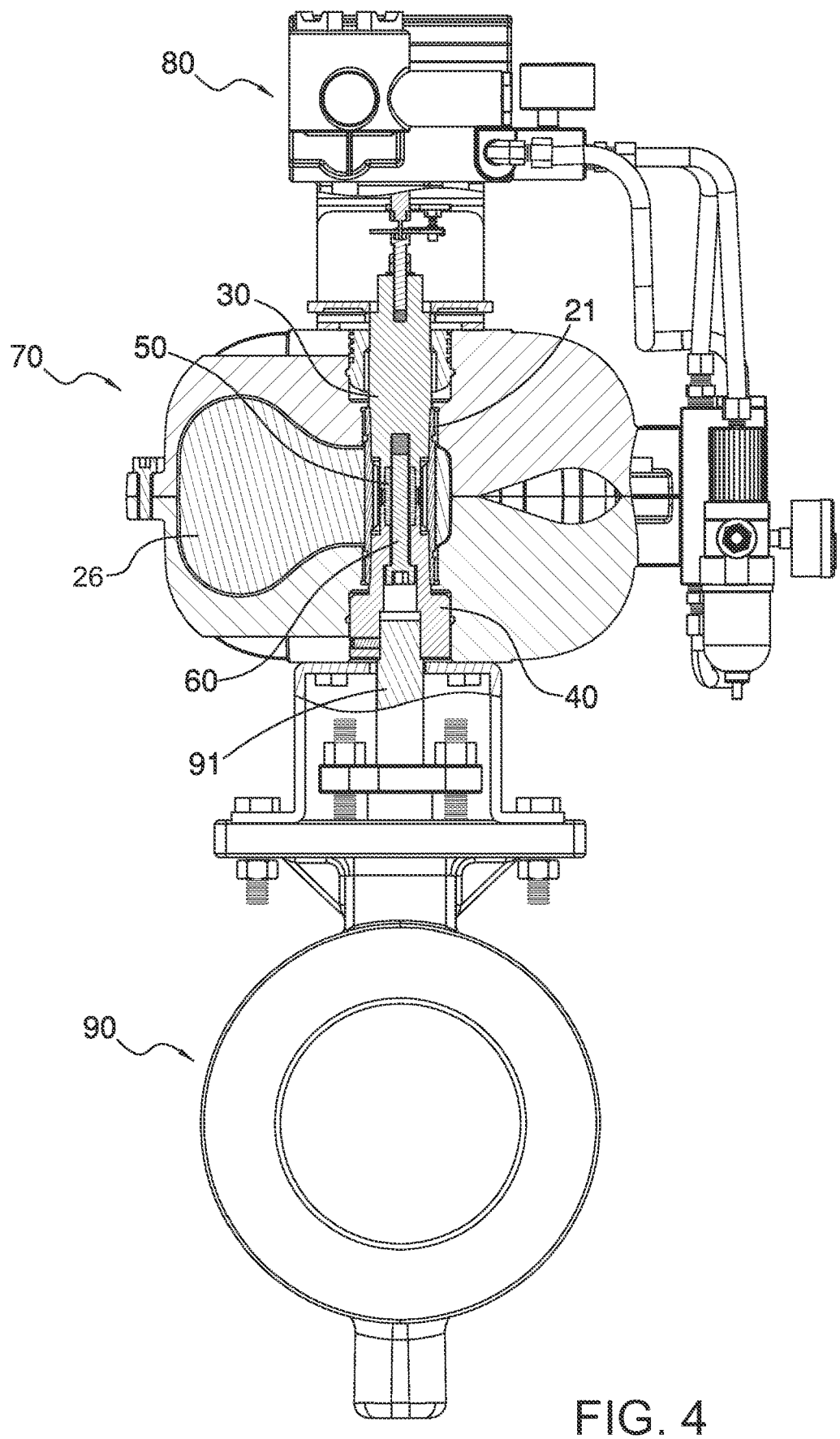
FIG. 4 is a schematic diagram and partial sectional view of the external shaft connection assembly in use according to one aspect.
Figure 5:
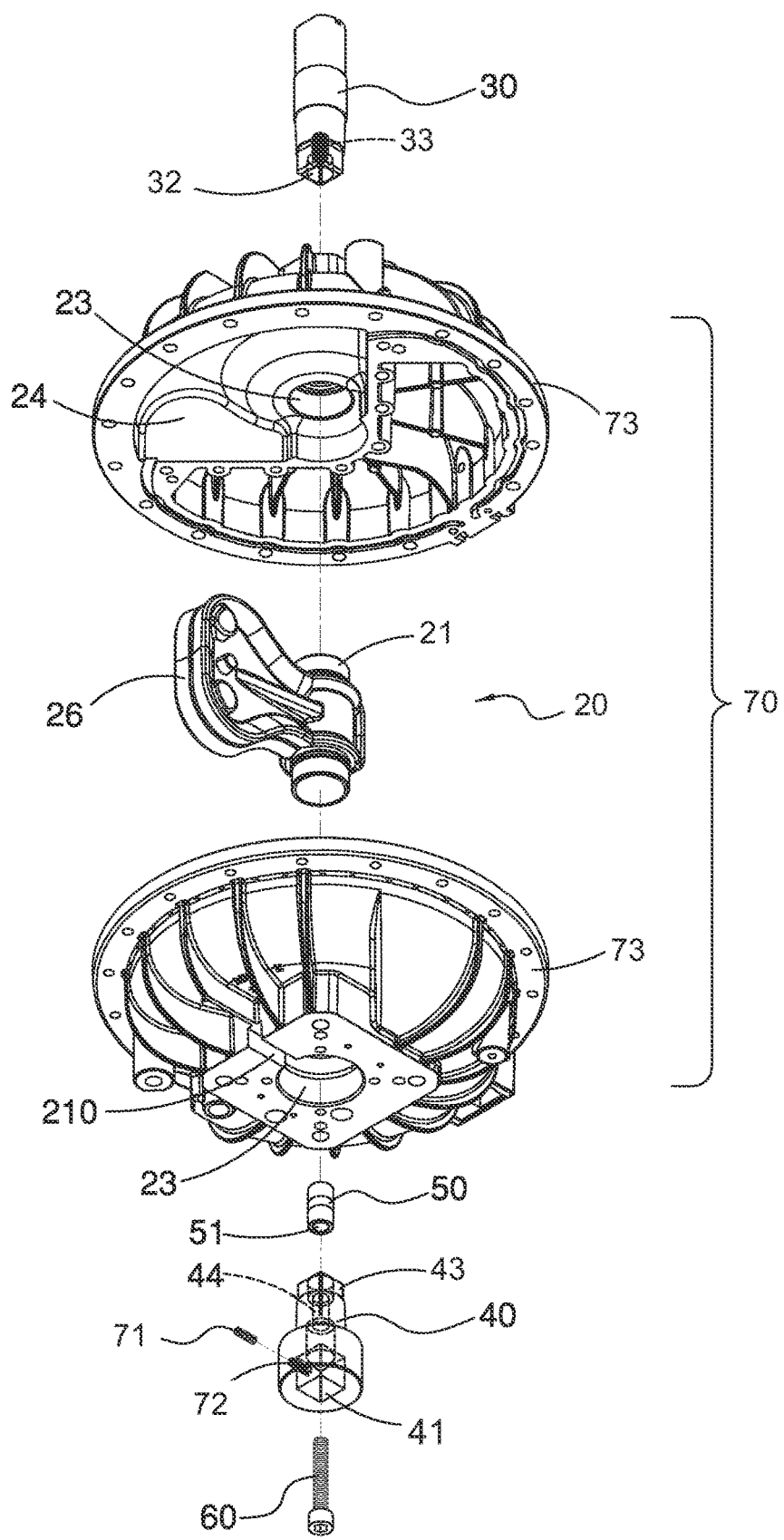
FIG. 5 is an exploded view of an external shaft connection assembly according to another aspect.
Figure 6:
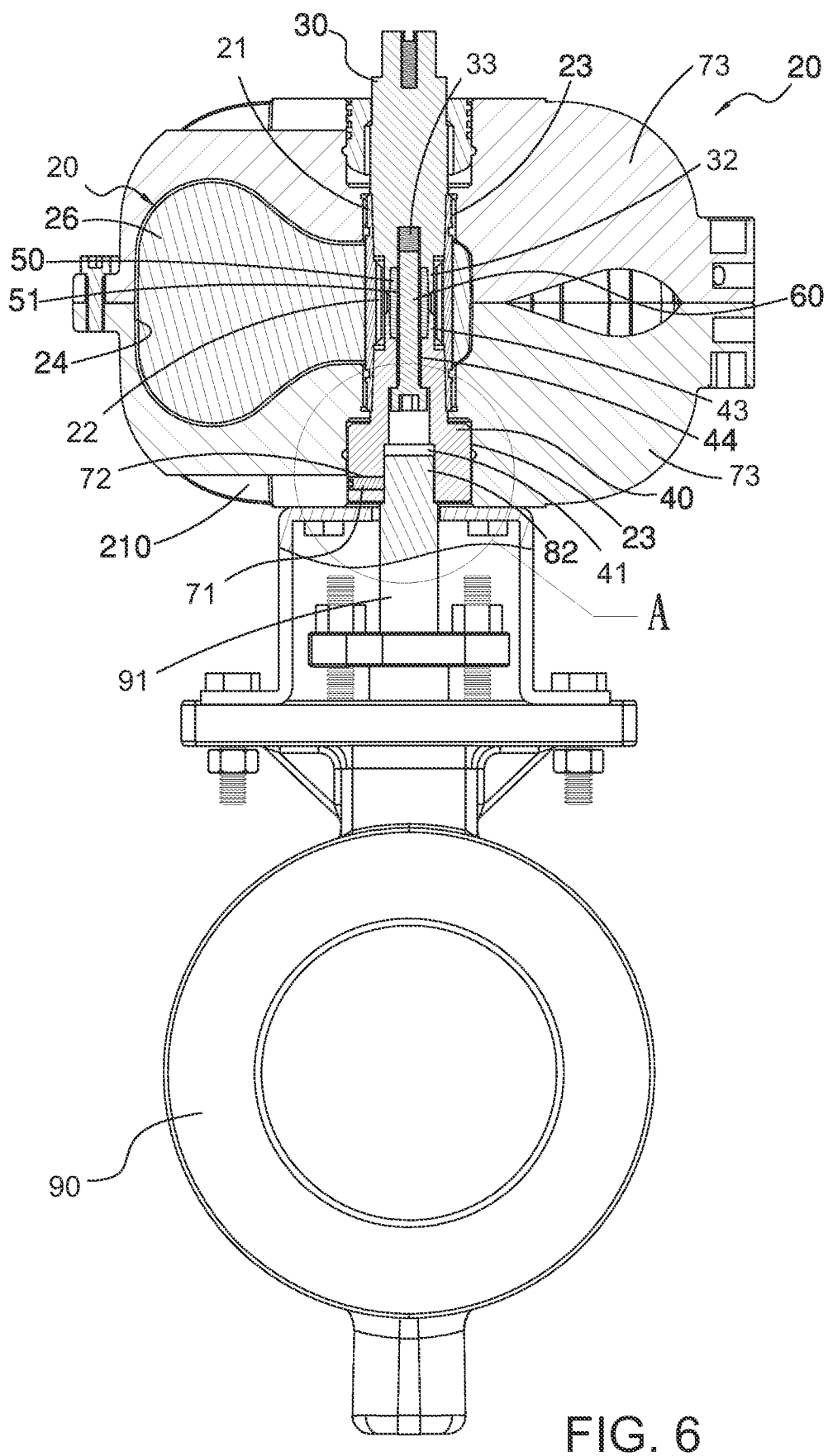
FIG. 6 is a schematic diagram and partial sectional view of the external shaft connection assembly in use according to another aspect.

The vane assembly 20 may be housed with a vane actuator 70, as shown in FIGS. 4-6, and may be rotated within the vane actuator 70 to control an external valve 90. In one aspect, the vane assembly 20 includes a vane 26 that defines the vane shaft 21 that further defines one or more vane shaft connection slots 22.

In various aspects, the vane shaft 21 defines a generally octagonal conduit. In other aspects, the vane shaft 21 may define a conduit of any geometry, including but not limited to a square conduit, a splined conduit, double-D conduit, or a keyhole conduit, among others. In various aspects, the outer perimeter of the external shaft connector post 42 and the upper shaft post 31 match or complement the shape of at least a portion of conduit formed in the vane shaft 21 so that the external shaft connector post and the upper shaft post engage the vane shaft in a mated connection.

Similarly, in various aspects, vane shaft connection slots 22 may have polygonal and/or rounder perimeters, while the external shaft connector post 42 and the upper shaft post 31 have reciprocal geometries that can engage the connection slots in a mated connection.

The upper shaft 30 may be configured to operably engage a positioner 80 to the vane actuator 70. According tone one aspect, as shown, in FIGS. 2 and 4, an upper end of the upper shaft 30 is engaged to the positioner 80, while, the lower end of the upper shaft has an upper shaft post 31. The upper shaft post 31 is configured to be received within the vane shaft 21 and to engage one or more of the vane shaft connection slots 22. The upper shaft post 31 allows rotation of the upper shaft 30 to rotate with the vane shaft 21. The upper shaft post 31 further defines an upper shaft ferrule recess 32. The bottom surface of the upper shaft ferrule recess 32 further includes a connecting threaded hole 33. In various aspects, the outer perimeter of the upper shaft post 31 has one or more upper shaft expansion slots 34 that extend through to the upper shaft ferrule recess 32.

In various other aspects, the upper shaft 30 may be integral with the vane shaft 21. For example, the vane 26 and the upper shaft 30 may be formed from a single unitary material stock. As such, the upper shaft 30 may be formed without a ferrule recess or any upper shaft expansion slots 34. In these aspects, a threaded hole may still be formed in a unitary assembly of the vane 26 and upper shaft 30 to engage and secure an external shaft connector 40.

According to one aspect, the compression ferrule 50 defines a ferrule thru hole 51. At least one of the upper and lower ends of the compression ferrule 50 are tapered thus forming an upper ferrule taper portion 52 and/or a lower ferrule taper portion 53, respectively. The upper ferrule taper 52 is configured to be received in the upper shaft ferrule recess 32 and the lower ferrule taper 53 is configured to be received in the external shaft connector ferrule recess 43, when the upper shaft 30 and the external shaft connector 40 are both engaged to the vane assembly 20. In one aspect as shown in FIG. 1, the lower ferrule taper 53 is tapered from a first diameter at the central portion 54 to a second diameter at a lower distal end, while the upper ferrule taper 52 is tapered from a third diameter at the central portion to a third diameter at an upper distal end.

In various aspects, only the lower end of the compression ferrule 50 is tapered such that the compression ferrule includes a lower ferrule taper portion 53 without an upper ferrule taper portion 52. This ferrule configuration may be used whether the upper shaft 30 is separate or integrated with the vane 26.

According to one aspect, the connecting bolt 60 may be engaged to the connecting thread hole 33 of the upper shaft 30 via the thru hole 44 and the ferrule thru hole 51 when the upper shaft 30 and the external shaft connector 40 are both engaged to the vane assembly 20. The connecting bolt 60 forces the upper shaft 30 and external shaft connector 40 to be compressed against the vane shaft connection slots 22 through the compression ferrule 50. In one particular example, the lower ferrule taper 53 forces the external shaft connector post 42 expand outwardly, so the outer peripheral surface is forced against the walls of the vane shaft connection slot 22. This outward expansion is facilitated at least in part by the external shaft connector expansion slot 45. Likewise, in other aspects, upon tightening the connecting bolt 60, the upper ferrule taper 52 contacts and expands the upper shaft post 31 outwardly against the walls of the vane shaft connection slot 22.

In various aspects, outward expansion of the external shaft connector post 42 against the walls of the vane shaft connection slot 22 eliminates or greatly mitigates any discrepancies in manufacturing tolerances or gaps initially present between the external shaft connector and the vane shaft 21. This, in turn, reduces inaccuracies, deviations, and/or transmission loss from the intended motion of the valve.

In various aspects, the first end of external shaft connector 40, further defines a threaded hole 72 transverse to a longitudinal axis of the connector recess 41 and the thru hole 44. A set screw 71 may be fastened into the threaded hole 72 to contact the valve stem 91 when present in the connector recess 41. In particular, the set screw 71 presses tightly against the side of the valve stem 91 to reduce inaccuracies and deviations from the intended motion transmission between the valve stem and the external shaft connector 40.

In one aspect, after insertion, the set screw 71 is fully inserted into the threaded hole 72, such that it does not protrude from the external shaft connecter 40. In other aspects, the threaded screw may be elongated to protrude from the external shaft connector 40 after contacting the valve stem.

To accommodate the use of the set screw 71, the vane actuator 70 includes a body slot 210 formed within the exterior housing 73 of the vane actuator, according to one aspect. As shown in FIGS. 5-6, the exterior housing 73 of the vane actuator 70 is composed of an upper and lower shell. The exterior housing 73 also defines one or more shaft apertures 23 to receive the valve shaft 91 via the external shaft connector 40 and the upper shaft 30. The body slot 210 permits access to adjust the set screw to reduce motion transmission errors from the exterior of the actuator. As such, adjustments may be made while the vane actuator is in operation.

Figure 7:
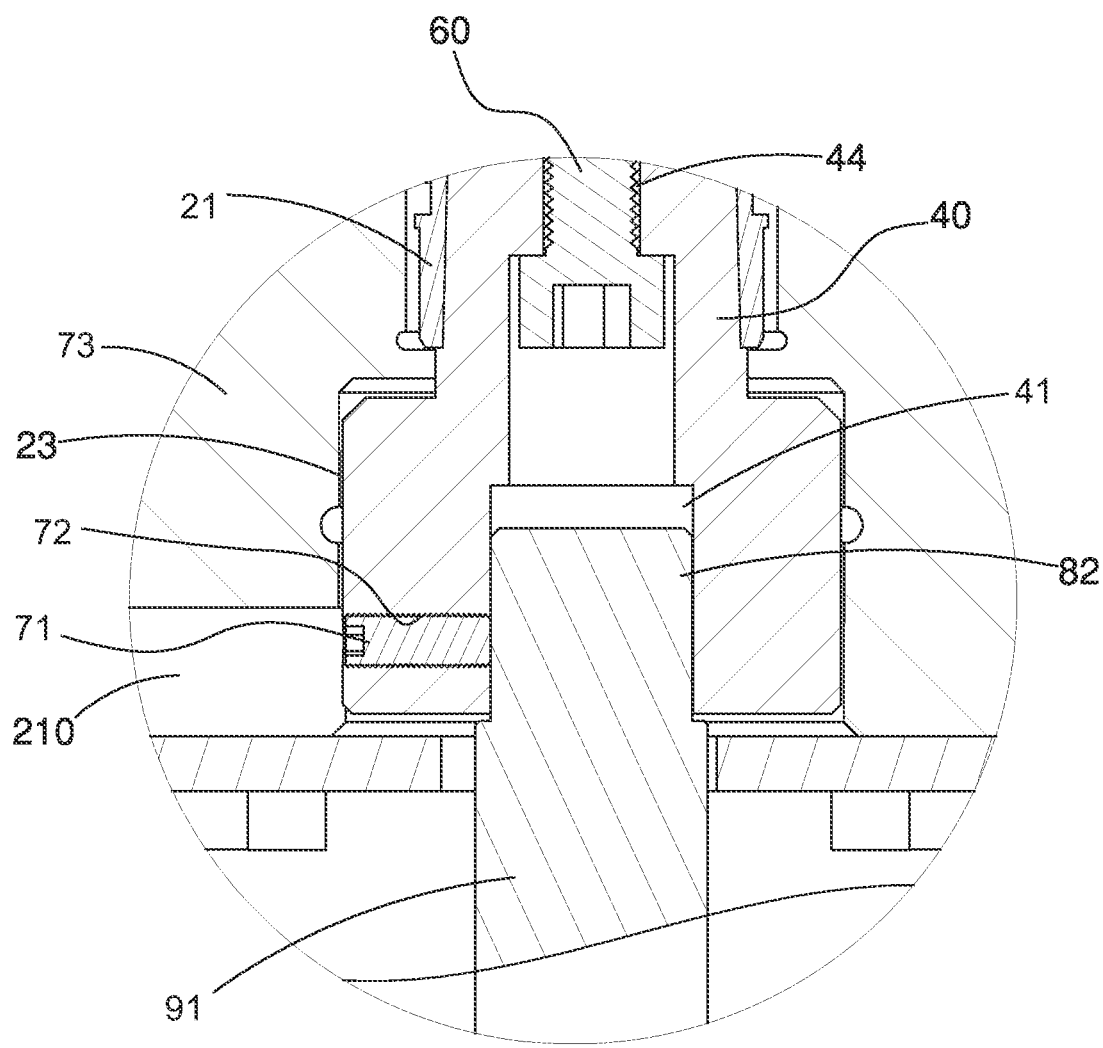
FIG. 7 is an enlarged view of portion A of FIG. 6, according to one aspect.

In one aspect, as shown in FIGS. 6-7, the valve shaft 91 may be structured to provide a shaft drive 82 to be compatible with variety of valve actuators. As shown the shaft drive 82 may have different dimensions the valve shaft. As such, the set screw 71 may be adjusted to accommodate any shaft drive configuration.

Those skilled in the art will appreciate that the presently disclosed aspects teach by way of example and not by limitation. Therefore, the matter contained in the above description or shown in the accompanying drawings should be interpreted as illustrative and not in a limiting sense. For example, although various elements and features may be described as lower or upper, they do not limit the arrangement of the assembly as the assembly may be assembled in any orientation. As such, the upper shaft and positioner may not be located above the vane actuator.

The following claims are intended to cover all generic and specific features described herein, as well as all statements of the scope of the method and system, which, as a matter of language, might be said to fall there between.

What is claimed is:

1. An external shaft connection assembly for a vane actuator, comprising:
   an external shaft connector configured to engage the vane actuator and a valve stem, the external shaft connector further comprising:
   a first end defining a connector recess configured to receive the valve stem;
   a second end defining a connector post configured to be received within the vane actuator, the connector post defining a ferrule recess and a perimeter of the connector post having one or more expansion slots; and
   a thru hole in communication with the connector recess and the ferrule recess.

2. The external shaft connection assembly of claim 1 wherein the connector post forms a mated connection with the vane actuator.

3. The external shaft connection assembly of claim 1, wherein the first end further defines a set screw hole transverse to a longitudinal axis of the external shaft connector, and the external shaft connector further comprises a set screw to be received through the set screw hole and configured to engage and compress the valve stem against the connector recess.

4. The external shaft connection assembly of claim 3, wherein the vane actuator further comprises a slot through an exterior housing of the vane actuator aligned with the set screw hole.

5. The external shaft connection assembly of claim 1, further comprising:
   an upper shaft engaged the vane actuator opposite the external shaft connector.

6. The external shaft connection assembly of claim 5, wherein the upper shaft is integrated with the vane actuator.

7. The external shaft connection assembly of claim 5, wherein the upper shaft is distinct from the vane actuator and further comprises:
   a first upper shaft end configured to engage a positioner; and
   a second upper shaft end comprising an upper shaft post; wherein the upper shaft post configured to be received within the vane actuator, the upper shaft post defining an upper shaft ferrule recess and an upper shaft perimeter having one or more upper shaft expansion slots.

8. The external shaft connection assembly of claim 7, wherein the upper shaft post forms a mated connection with the vane actuator.

9. The external shaft connection assembly of claim 5, wherein the upper shaft further includes a threaded opening to receive a threaded fastener.

10. The external shaft connection assembly of claim 1 further comprising a compression ferrule, wherein the compression ferrule is configured to be received in the ferrule recess.

11. The external shaft connection assembly of claim 10, wherein the compression ferrule further comprises:
  a lower ferrule region that is tapered from a first diameter at a central portion of the compression ferrule to a second diameter at a lower distal end; and
  a ferrule thru-hole extending through the compression ferrule from an upper distal end to the lower distal end.

12. The external shaft connection assembly of claim 11, wherein the second diameter is less than the first diameter.

13. The external shaft connection assembly of claim 10 further comprising a connecting fastener, wherein the connecting fastener is configured to be received in a vane shaft of the vane actuator through the external shaft connector, the compression ferrule and received in an upper shaft.

14. The external shaft connection assembly of claim 13, wherein the connection fastener is threaded and configured to draw the external shaft connector towards the vane shaft.

15. An external shaft connection assembly for a vane actuator, comprising:
  an external shaft connector configured to engage the vane actuator and a valve stem, the external shaft connector further comprising:
    a first end defining a connector recess configured to receive the valve stem;
    a second end defining a connector post configured to be received within the vane actuator, the connector post defining a ferrule recess and a perimeter of the connector post having one or more expansion slots; and
    a thru hole in communication with the connector recess and the ferrule recess;
  an upper shaft engaged to the vane actuator opposite the external shaft;
  a compression ferrule configured to be received in the ferrule recess, the compression ferrule further comprising:
    a lower ferrule portion that is tapered from a first diameter at a central portion of the compression ferrule to a second diameter at a lower distal end;
    a ferrule thru-hole extending through the compression ferrule from an upper distal end to the lower distal end;
  a connecting fastener configured to be received in vane shaft through the external shaft connector, the compression ferrule and received in the vane actuator;
  wherein the connection fastener is threaded and configured to compress the external shaft connector towards the compression ferrule and the vane actuator; and
  wherein the one or more expansion slots of the external shaft connector are configured to expand outward upon compression against the compression ferrule to engage the vane shaft.

16. The external shaft connection assembly of claim 15 wherein the upper shaft is integrated with the vane actuator.

17. The external shaft connection assembly of claim 15, wherein the upper shaft is distinct from the vane actuator and further comprises:
  a first upper shaft end configured to engage a positioner;
  a second upper shaft end comprising an upper shaft post, wherein the upper shaft post configured to be received within the vane actuator, the upper shaft post defining an upper shaft ferrule recess configured to engage the compression ferrule, and an upper shaft perimeter having one or more upper shaft expansion slots where the upper shaft ferrule recess further defines a threaded opening;
wherein the connecting fastener is further configured to be received in the upper shaft and configured to compress the upper shaft towards the vane actuator; and
wherein the one or more upper shaft expansion slots are configured to expand outward upon compression against the compression ferrule to engage the vane shaft.

18. An external shaft connection assembly for a vane actuator, comprising:
  an external shaft connector configured to engage the vane actuator and a valve stem, the external shaft connector further comprising:
    a first end defining a connector recess configured to receive the valve stem, the first end further defining a set screw hole transverse to a longitudinal axis of the external shaft connector;
    a second end defining a connector post configured to be received within the vane actuator; and
    a set screw to be received through the set screw hole and configured to engage and compress the valve stem against the connector recess; wherein the vane actuator further comprises a slot through an exterior housing of the vane actuator aligned with the set screw hole.

* * * * *